United States Patent
Albert et al.

(10) Patent No.: US 9,453,313 B2
(45) Date of Patent: Sep. 27, 2016

(54) SYSTEMS, METHODS AND DEVICES FOR WATER AND ENERGY SAVINGS DURING ICE RESURFACING

(71) Applicant: GREINS ENVIRONMENTAL TECHNOLOGIES INC., Russell (CA)

(72) Inventors: Ronald Albert, Ottawa (CA); Doug Graham, Russell (CA); Darin Dowich, Ottawa (CA); Marc Burnet, Kenmore (CA)

(73) Assignee: GREINS ENVIRONMENTAL TECHNOLOGIES INC., Russell (CA)

( * ) Notice: Subject to any disclaimer, the term of this patent is extended or adjusted under 35 U.S.C. 154(b) by 31 days.

(21) Appl. No.: 14/402,643

(22) PCT Filed: May 1, 2013

(86) PCT No.: PCT/CA2013/000434
§ 371 (c)(1),
(2) Date: Nov. 20, 2014

(87) PCT Pub. No.: WO2013/163741
PCT Pub. Date: Nov. 7, 2013

(65) Prior Publication Data
US 2015/0143725 A1   May 28, 2015

Related U.S. Application Data

(60) Provisional application No. 61/642,585, filed on May 4, 2012.

(51) Int. Cl.
*E01H 4/02* (2006.01)
*C02F 1/32* (2006.01)
*C02F 1/28* (2006.01)
*C02F 103/00* (2006.01)

(52) U.S. Cl.
CPC ............... *E01H 4/023* (2013.01); *C02F 1/283* (2013.01); *C02F 1/32* (2013.01); *C02F 2103/001* (2013.01); *Y10T 29/49352* (2015.01)

(58) Field of Classification Search
CPC ........... E01H 4/023; E01H 5/07; E01H 4/00; E01H 4/02; C02F 1/32; C02F 1/283; C02F 2103/001; Y10T 29/49352
USPC ....... 37/219, 225, 237; 172/500; 299/24, 25, 299/36.1, 39.8
See application file for complete search history.

(56) References Cited

U.S. PATENT DOCUMENTS

| | | | | |
|---|---|---|---|---|
| 2,763,939 A * | 9/1956 | Zamboni | ................. | E01H 4/023 299/24 |
| 3,622,205 A * | 11/1971 | Zamboni | ................. | E01H 4/023 172/500 |
| 3,705,746 A * | 12/1972 | McLeod | ................. | E01H 4/023 299/25 |
| 3,917,350 A * | 11/1975 | Bricher | ................. | E01H 4/023 299/24 |

OTHER PUBLICATIONS

Nickitas-Etienne, Athina "International Preliminary Report on Patentability—International Application No. PCT/CA2013/000434" The International Bureau of WIPO Nov. 4, 2014; pp. 1-5.

* cited by examiner

*Primary Examiner* — Robert Pezzuto
(74) *Attorney, Agent, or Firm* — Nicholas J. Landau; Bradley Arant Boult Cummings LLP

(57) ABSTRACT

Systems, methods and devices for converting existing ice resurfacers to reuse collected ice and snow for further ice resurfacing. The systems, methods and devices allows for efficient, clean and environmental friendly ice resurfacing. The conversion includes the modification and/or replacement of the snow dump tank, main water tank and the installing of heating and power systems. This invention is designed for present machines and for incorporation into future manufacturing of ice resurfacers. While reducing the requirement for large amounts of fresh water, the surface water being pre-heated by two commercial hot water tanks, it also reduces the amount of labor and costs associated with ice resurfacing.

37 Claims, 5 Drawing Sheets

SYSTEMS, METHODS AND DEVICES FOR WATER AND ENERGY SAVINGS DURING ICE RESURFACING

CROSS-REFERENCE TO RELATED APPLICATIONS

This application is a national stage of International Application No. PCT/CA2013/000434, filed on 1 May 2013. International Application No. PCT/CA2013/000434 cites the priority of U.S. Patent Application No. 61/642,585, filed on 4 May 2012.

FIELD OF THE INVENTION

The present invention relates to ice resurfacers. More specifically, the present invention relates to systems, methods and devices for recycling snow and ice shavings from an ice rink for ice resurfacing.

BACKGROUND OF THE INVENTION

To maintain their optimum usefulness, all ice rinks require maintenance. Ice skates, by their very nature, are destructive to ice rinks as skates will score, scratch, and cut the ice on an ice rink. In addition to this, continued use of ice skates on an ice rink will cause the accumulation of slush, snow and dirt. It is, therefore, necessary to quickly and effectively resurface the used ice using minimal energy and resources. During rink maintenance, an ice resurfacer shaves a relatively thin layer (1/16-inch to 1/8-inch) of ice from the ice surface. The resulting ice shavings and snow is then collected and directed through a series of horizontal and vertical augers into the snow dump tank receptacle. As this is occurring, the ice resurfacer deposits on the surface of the rink a layer of fresh hot water which fills cracks and imperfections on the ice surface. Currently, after the ice resurfacer finishes its operation, the contents of the snow dump tank is disposed of inside or outside of the rink (for example, the content of the snow dump tank is often dumped outside of the ice rink building).

During the above operation cycle, a substantial amount of energy, labour, material and fresh water are used. For example, every time an average sized ice rink is flooded, it requires the use of approximately 200 to 700 liters of fresh water heated to a temperature of between 50 and 60 degrees Celsius. This large quantity of water must first be heated in a large commercial external hot water tank and, once heated, the water is then sent to another large commercial hot water holding tank. The heated water is stored so that it remains heated between resurfacing periods. The ice resurfacing and cleaning machine is manually filled with the hot water by a worker using a hose before ice resurfacing. The process thus requires material, labor, fresh water and additional energy before each ice resurfacing cycle.

Zamboni® and Olympia® are well-known brands of ice resurfacers.

Various machines have been proposed which use different heat sources to melt snow and ice shavings for water re-use. Examples of these machines include those disclosed in U.S. Pat. Nos. 7,380,355, 5,536,411, and 3,705,746. Different approaches include utilizing heat from the burning of a combustible fuel material, recovering heat from a refrigeration unit, or rejecting heat from the machine drive engine. While some of these approaches have advantages, most have not been adopted for use by ice resurfacers. As well, none of these approaches have been truly economical as they would require redesign and replacement of current ice resurfacers.

Based on the above, there is therefore a need for methods, systems, or devices which would mitigate if not overcome the deficiencies of the prior art.

SUMMARY OF INVENTION

The present invention provides methods, systems, and devices relating to ice resurfacers. A retrofitted ice resurfacer has a snow tank for storing ice shavings, an active heating system for melting the ice shavings, a filtration subsystem for filtering the melted ice shavings, a main water tank for storing the filtered water from the melted ice shavings, and a water tank heating subsystem for heating the main water tank. The ice resurfacer scrapes a layer of ice from the ice rink and the resulting ice shavings are dumped into the snow tank. The ice shavings are then melted using the active heating subsystem. The melted ice is then stored in the main water tank. In a preferred embodiment, the water is filtered and purified prior to being stored in the main water tank. While in the main water tank, the filtered and purified water is heated to a specific temperature. The heated filtered water is then re-used by the ice resurfacer when resurfacing the ice surface. Alternatively, the heated water in the main water tank can be filtered and purified prior to re-use.

In one aspect, the present invention provides a system for recycling water derived from ice from an ice rink, the system comprising:
  a snow tank for ice shavings removed from said ice rink by an ice resurfacing machine;
  a heating subsystem for heating said ice shavings to thereby melt said ice shavings and produce water;
  a filtration subsystem for filtering water resulting from melted ice shavings and to thereby produce filtered water;
  a main water tank for receiving and storing filtered water from said filtration subsystem;
  a water tank heating subsystem for heating stored filtered water in said main water tank to produce heated water;
  a conduit system for routing heated water from said main water tank for use in resurfacing said ice rink;
wherein said system is located on said ice resurfacing machine.

In a further aspect, the present invention provides a method for modifying an existing ice resurfacing machine, the method comprising:
  replacing and/or modifying an existing snow tank by (for example, by cutting out a hole for hopper and couplers to allow said snow tank to be in flow communication with a main water tank);
  installing a heating subsystem for heating ice shavings in said snow tank;
  installing a filtering subsystem, said filtering subsystem being for filtering water produced when said ice shavings are heated by said heating subsystem to produce filtered water and for directing the filtered water to a main water tank;
  replacing and/or modifying a main water tank, for example, by creating a hole in the top of the tank to fit the hopper assembly, creating one or more holes for the couplers, and removing and/or modifying the baffle to accommodate the piping;
  installing a water tank heating subsystem, said water tank heating subsystem suitable for heating filtered water in said main water tank.

In an additional aspect, the present invention provides a method for recycling water derived from ice shavings from an ice rink, the method comprising:
a) scraping ice shavings from a surface of an ice rink;
b) placing said ice shavings in a snow tank;
c) applying heat to said ice shavings to thereby melt said ice shavings and produce water;
d) directing water produced in step c) to a filtering subsystem;
e) filtering and purifying said water in said filtering subsystem to produce filtered water;
f) directing said filtered/purified water to a main water tank;
g) heating said filtered water to a predetermined temperature to produce heated filtered water; and
h) using said heated filtered water to resurface said surface of said ice rink.

In accordance with another aspect, the present invention provides a kit of parts for converting an existing ice resurfacing machine, the kit comprising:
- a heating subsystem for heating an existing snow dump tank on said ice resurfacing machine, said heating subsystem suitable for melting ice and snow collected from an ice rink being resurfaced and stored in said snow dump tank;
- preferably a filtration and purification subsystem for filtering and purifying water resulting from melted ice and snow;
- a main water tank heating subsystem for heating a main water tank, said main water tank storing filtered water from said filter subsystem;
- a power system for providing power to said heating subsystem and said main water tank heating subsystem;

wherein a converted ice resurfacing machine resulting from installing said kit of parts on said ice resurfacing machine uses water recycled from said collected ice and snow to resurface said ice rink.

The present invention is suitable for use in the conversion of existing ice resurfacing and cleaning machines. This potentially reduces the ongoing cost required to maintain and operate such machines. As an example, the majority of ice and skating rinks already utilizes one or more ice resurfacing machines. By converting or retrofitting these machines to recycle the ice gathered during ice resurfacing, the energy, material and labour savings may be significant. These savings may amount to $50,000 to 60,000 USD a year.

The present invention has the potential to provide for a drastic reduction in the fresh water normally required by the ice resurfacing machines between ice rink maintenance periods. As well, converted ice resurfacing machines require less energy and manpower to operate, thereby leading to more savings.

Another advantage of the present invention stems from eliminating the need for two external hot water heating tanks. Currently, one tank is used to heat the fresh water while another tank is used to hold the heated water. The storage tank is kept at a temperature high enough to ensure that sufficient hot water is available for the ice resurfacing machines. Not only does the present invention only use a single tank, but in doing so, it also eliminates the wasted energy that would have been used by the two external hot water tanks.

The foregoing advantages of the present invention will become apparent to those skilled in the art upon consideration of the following description of the present invention.

BRIEF DESCRIPTION OF THE DRAWINGS

The embodiments of the present invention will now be described by reference to the following figures, in which identical reference numerals in different figures indicate identical elements and in which.

The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention.

DETAILED DESCRIPTION OF THE INVENTION

The terms "coupled" and "connected", along with their derivatives, may be used herein. It should be understood that these terms are not intended as synonyms for each other. Rather, in particular embodiments, "connected" may be used to indicate that two or more elements are in direct physical or electrical contact with each other. "Coupled" may be used to indicated that two or more elements are in either direct or indirect (with other intervening elements between them) physical or electrical contact with each other, or that the two or more elements co-operate or interact with each other (e.g. as in a cause and effect relationship).

Figure 1:
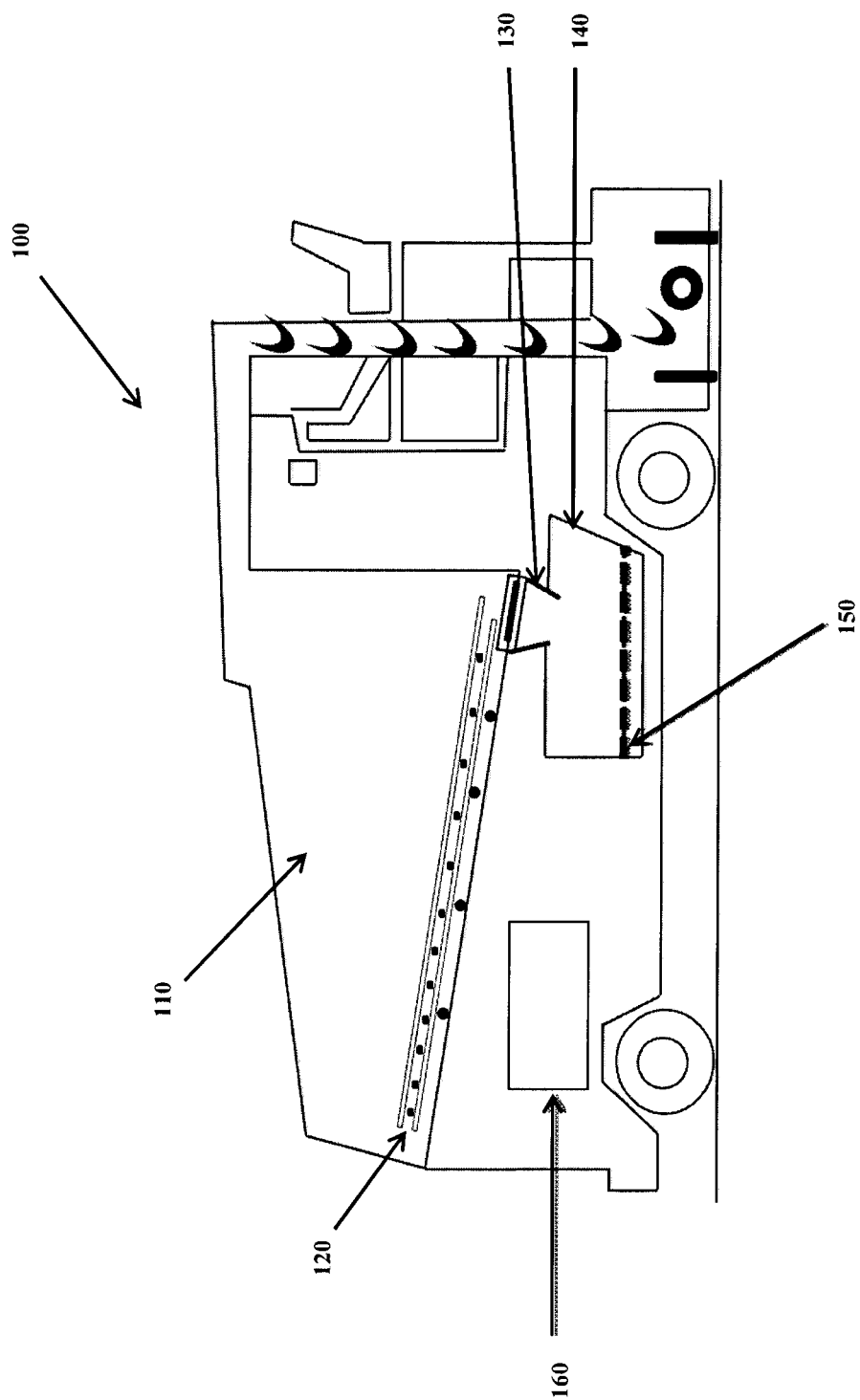
FIG. 1 represents a basic overview of the retrofitted ice resurfacing system.

An overview of a retrofitted ice resurfacing machine system for reusing collected snow and ice shavings for further ice resurfacing is shown in FIG. 1. The system includes an existing ice resurfacing machine 100. Inside the ice resurfacing machine is a snow dump tank 110, a snow tank heating subsystem, a filtering assembly 130 (which connects to and allows flow communication between the snow dump tank and a main water tank 140), the main water tank 140, a main water tank heating subsystem 150, and a power system 160.

Figure 2:
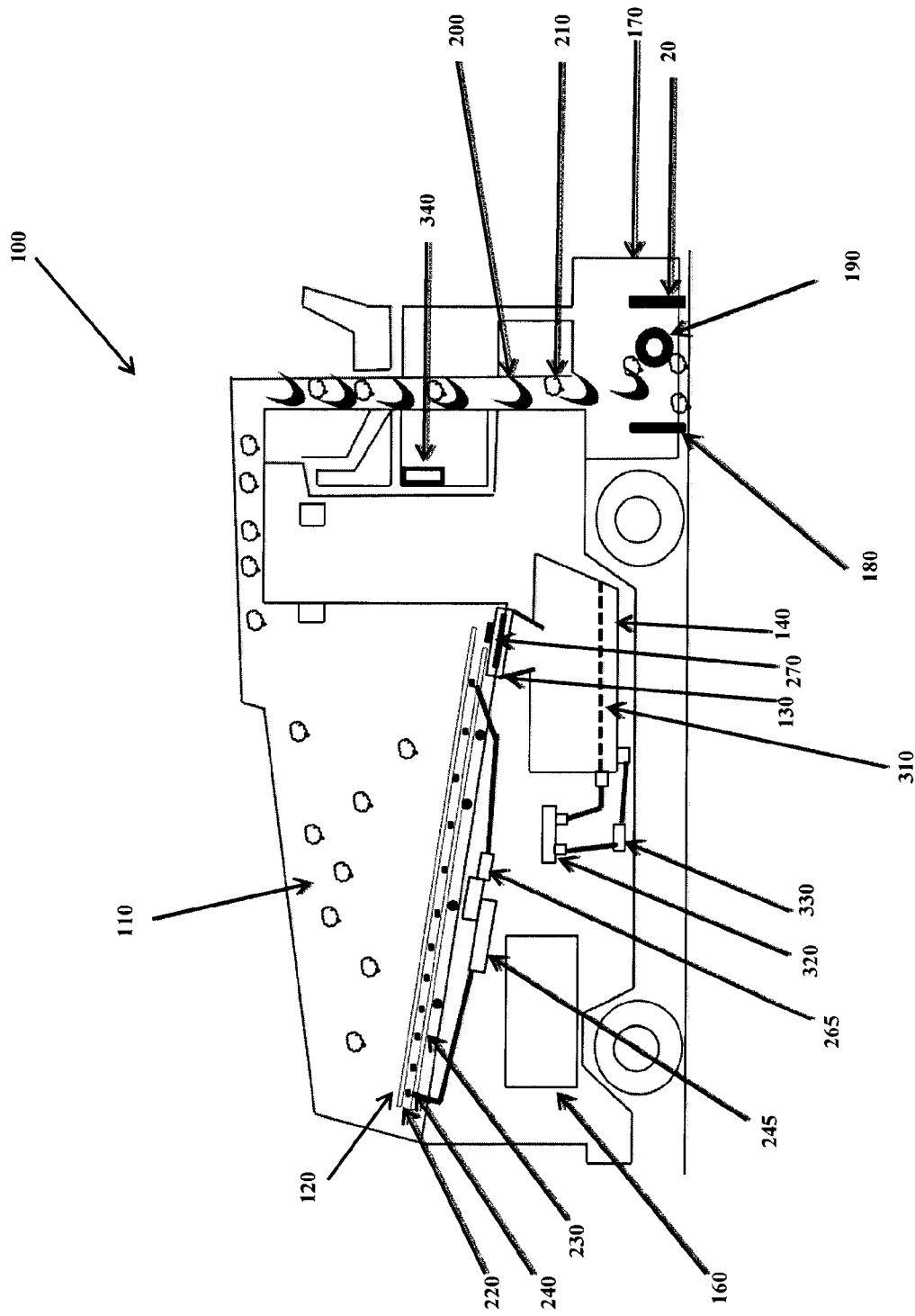
FIG. 2 represents a detailed overview of the retrofitted system.

An explanation of the ice resurfacing machine 100 illustrated in FIG. 1 can be better understood in conjunction with the details illustrated in FIG. 2. Referring to FIG. 2, the ice resurfacing machine 100 is equipped with a conditioner 170. As the ice resurfacing machine 100 moves in a forward direction across an ice surface, the conditioner 170 is lowered to the ice surface (usually hydraulically lowered). Within the conditioner 170 is a blade 180 which is lowered to an industry standard height from the ice surface (usually manually lowered). The blade 180 shaves a thin slice off the ice surface. A series of coupled augers (horizontal augers 190 and vertical augers 200) collect the ice and snow shavings 210 and convey and deposit these to the snow dump tank receptacle 110 mounted on the ice resurfacing machine 100.

In the illustrated embodiment of the present invention the snow dump tank 110 in the ice resurfacing machine 100 has been modified from that of a conventional ice resurfacing machine. The snow dump tank 110 is angled downwardly towards the back of the tank and incorporates a snow tank heating subsystem for melting the ice and snow shavings. The snow dump tank is replaced and/or modified to include holes for the hopper and couplers. Preferably, the snow tank heating subsystem is able to provide enough heat to melt the collected ice and snow shavings 210 into water. In the embodiment shown in FIG. 2, the snow tank heating subsystem includes a heated metal filter screen 220, a heated metal grate 230 and at least one heating pipe 240 (the heating pipe or tube may be constructed from any suitable material, including stainless steel, nickel alloys, as well as iron-chromium-aluminium alloys that can be used at temperatures up to 1250° C. (2280° F.)). These various parts are attached to or embedded in the snow dump tank 110 using metal clips, ties or pins. It would be readily apparent to a person skilled in the art that the snow dump tank on an ice resurfacing machine can be modified, as described above, or simply replaced with a snow dump tank adapted to function in accordance with the present invention.

Regarding the snow tank heating subsystem, the various components may be designed for ease of use. For portability and to facilitate easy cleaning and maintenance of the snow dump tank 110, the heated metal grate 230 may ride on rollers or casters 250 spaced on each side of the heated metal grate 230 to allow it to be easily removed from the snow dump tank 110. This arrangement is illustrated in FIG. 3*a*, a plan view of the grate 230 showing the heating pipes 240, the casters 250, and the grate 230.

Regarding construction, the removable heated metal grate 230 may be made by stitching or welding stainless steel grate pieces together and cutting off the extra pieces depending on the dimensions of the snow dump tank 110. A person skilled in the art would be well aware that the grate 230 could be constructed from other materials that is heat resistant.

As noted above, in the illustrated embodiment the snow tank heating subsystem includes a removable heated metal filter screen 220. This may be fastened to the stainless steel circulation heater pipes 240 with metal clips, ties or pins. A plan view of the metal filter screen is provided in FIG. 3(*b*). The removable heated metal filter screen 220 may be constructed from flat stainless steel sheets and is preferably positioned above the stainless steel circulation heater pipes 240. The filter screen can be removed and cleaned by pulling it out from the front of the ice resurfacing device 100. This is done by removing the stainless steel straps that are attached the stainless steel circulation heater pipes 240. The metal filter screen 220 protects the stainless steel circulation heater pipes 240 and also may serve as a first filter to catch large debris such as hockey pucks that may be picked up along with the shaved snow and ice.

Figure 3A:
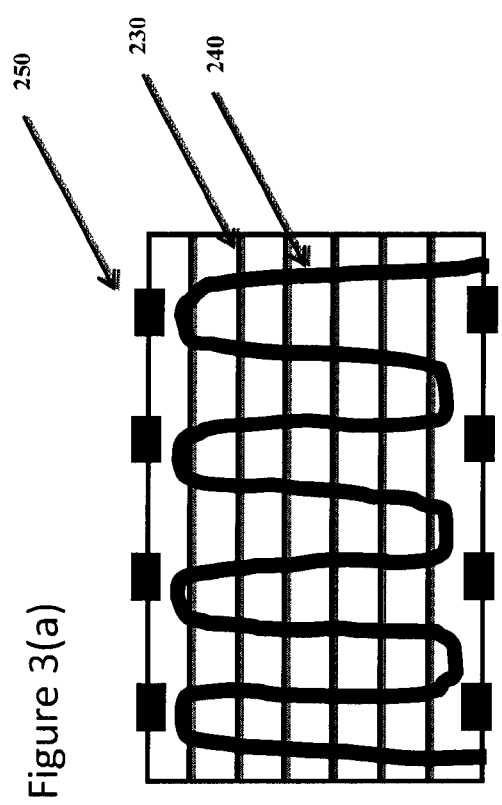
FIG. 3 represents the metal grate system installed in the snow dump tank receptacle for melting the collected ice and snow shavings.

Regarding the snow tank heating subsystem shown in FIGS. 2 and 3*a*, the removable heated metal grate 230 is heated by the heater pipes 240. The pipes 240 may be filled with a heated solvent that would flow through the pipes 240 and which would, in turn, heat the pipes 240, the metal grate 230 and the metal filter screen 220. This heat will melt the collected ice and snow shavings into water. In one embodiment, the heater pipes 240 are filled with Therminol 75 oil, heated to 200° C. by a circulation heater 245. Referring to FIG. 3(*a*), the heater pipes 240 are placed and tied down with metal clips, ties, or pins on top of the removable heated metal grate 230. The heater pipes 240 are vertically spaced from the metal grate 230 and the filter screen 220. The heater pipes 240 horizontally span from the front of the snow dump tank 110 to the back of the snow dump tank 110. The number of pipes used can be varied to accommodate different temperatures outside the ice resurfacing device 100, the amount of ice scraped off the blade, and the industry standard temperature required to clean the ice. The addition of more pipes and spacing the pipes closer to one another on the metal grate 230 would allow for quicker melting of the shaved ice and snow.

Referring to FIG. 2, the stainless steel circulation heater pipes 240 are heated when the circulation heater 245, heats the Therminol® 75 oil to 200° C. The heated oil is continuously pumped and circulated through the circulation heater pipes 240 by pump 265. The circulation heater 245 used in one implementation is a 5 kilowatt Wattco circulation heater model # MFLS605X2421-TM. A person skilled in the art would be well aware that other suitable heaters can be used. A circulation heater pump 330 is used to pump and circulate the oil throughout the system. Preferably, the circulation pump is one which is designed specifically for handling hot thermal fluids. As well, it is preferred that the circulation pump be engineered to allow ambient air cooling while minimizing thermal transfer along the shaft eliminating any need for liquid cooling through their operating range. In one implementation, the circulation pump used is a ZTND model from SIHI Pumps Americas.

The Therminol 75 synthetic heat transfer fluid used in one implementation is composed of Terphenyl/quaterphenyl. This fluid is a high temperature liquid phase heat transfer fluid having excellent thermal stability. In one implementation, the Therminol 75 oil is used in the 5 kilowatt Wattco circulation heaters. Furthermore, a person of ordinary skill in the art would be well aware that other suitable heat transfer fluids may be used, for example, Dowtherm A or G/Therminol 59, 60, LT and VP1. Furthermore, in the event oil is not preferred as the fluid for use in the heating system, an ethylene glycol and water mix may be used.

It should be noted that the snow tank heating subsystem may include components and parts which have not been mentioned. It is to be understood that a skilled artisan will know of other commonly known alternatives and devices which may be incorporated into the present invention.

Once the shaved ice has been melted by the snow tank heating subsystem, the resulting water flows towards the filtering assembly 130. The water from the melted shaved ice and snow flows into the filtering assembly 130 where the water is filtered and then funneled to the main water tank 140.

Figure 3B:
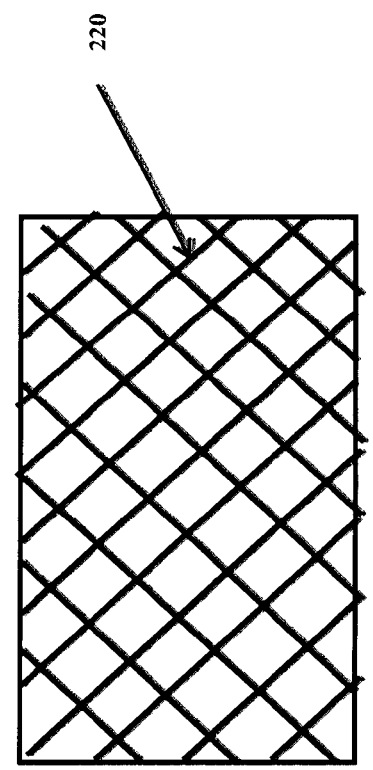
Figure 4:
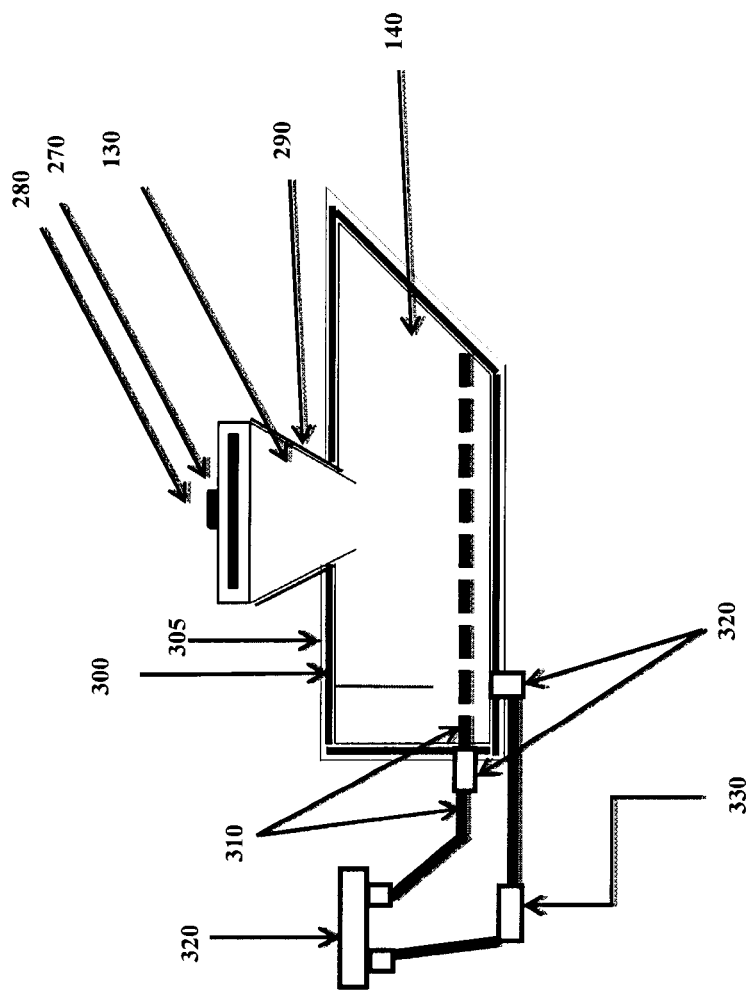
FIG. 4 represents the hopper device for connecting the snow dump tank to the main water tank, and the main water tank that has been insulated and retrofitted with a heating device.
Figure 5:
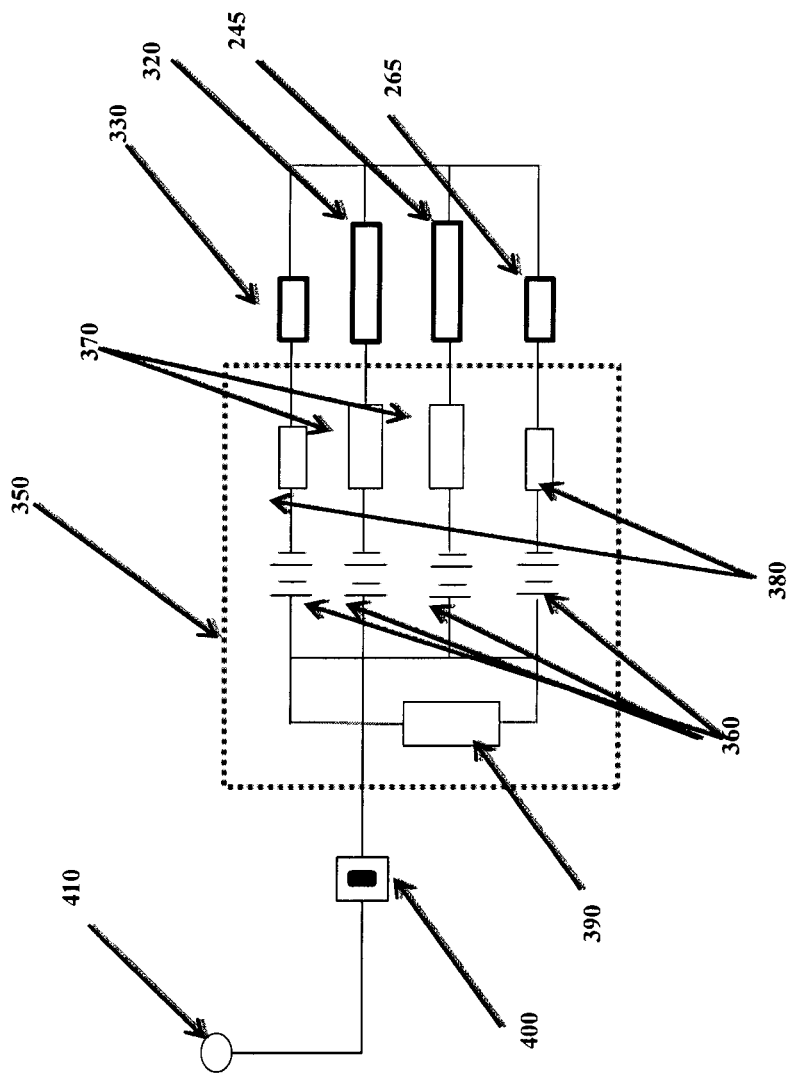
FIG. 5 represents of a schematic of the power system used to operate the heating devices in the retrofitted snow resurfacing machine.

Referring to FIGS. 3-5, these diagrams detail the various features and components of subsystems which comprise part of the present invention. FIGS. 3*a* and 3*b* show parts of the snow tank heating subsystem which melts the ice and snow shavings to result in water. FIG. 4 illustrates the main water tank and the filtering subsystem which filters the melted ice to result in the filtered water that is stored in the main water tank.

Referring to FIG. 4, includes a side view of the main water tank 140, the main water tank heating subsystem 150 and the filtering assembly 130 is illustrated. The filtering assembly 130 has a filter 270 and a pull out filter casing 280. The filter 270 may be any filter suitable for filtering the melted water, such as a charcoal filter. The filtering assembly 130 is preferably constructed of a stainless steel frame angled to form a downward pointing funnel shape such that filtered water is directed towards the main water tank 140. The filter 270 may be placed inside the pull out filter casing 280. This allows for the easy removal and replacement of the filter 270 from the filter casing 280. The pull out filter casing 280 is constructed of a stainless steel frame with a pull handle attached to it. Preferably, the junction 290 between the filtering assembly 130 and the main water tank 140 is sealed using a rubber seal, silicone seal, or cork such that the junction is water-tight. The seal can be installed using glue, epoxy, strapping, or any other suitable means for attaching the seal to the main water tank and the filter assembly.

As the melted ice and snow flows as water to the filtering assembly 130, the melted water is cleaned when it flows through the filter 270. The filtered water is then gravity fed into the main water tank 140. The downwardly pointed funnel shape of the filtering assembly assists in the melting of the shaved ice and snow as the large opening of the filter assembly will allow heated air from the heated main water tank 140 to rise into the snow dump tank 110.

Regarding the main water tank 140, this may be made of stainless steel. The main water tank 140 of the present invention is equipped to heat the collected melted snow and ice and to keep the filtered water at a specific temperature range. The present invention works with existing, modified and/or re-designed main water tanks. These main water tanks are, invariably, equipped with a water top-up pipe (not shown) should there be a need to use additional water or to top-up any evaporated water as needed.

The main water tank 140 is preferably insulated in order to minimize heat loss so that the water, once heated, stays heated longer in the main water tank 140. In the illustrated embodiment, the main water tank 140 has insulation 300. For example, the main water tank 140 can be insulated by first applying a gasoline sealant, such as Red Kote™, and then using a suitable insulator. Preferably, the insulator is a spray foam insulation with an insulation rating between R-12 and R-20. The main water tank is covered with a tank cover 305 made of stainless steel sheet with a cut-out to accommodate the filtering assembly 130 and may be secured to the main water tank 140 with the use of stainless steel self-tapping screws.

The main water tank 140 is equipped with a main water tank heating subsystem 150 to heat the water collected in the main water tank. As can be seen in FIG. 2, one implementation of the main water tank heating subsystem includes stainless steel circulation heater pipes 310. These pipes 310 are mounted on stainless steel brackets and are elevated at about 1 inch off the bottom of the main water tank 140 in order to keep the pipes from losing heat to the main water tank 140. Referring to FIG. 4, this implementation of the main water tank heating subsystem 150 includes two couplers 325 for the incoming and outgoing circulation pipes 310. The couplers are welded onto the main water tank 140 to ensure the main water tank 140 is fully sealed. The number of pipes and the spacing can be varied to accommodate the temperature outside the ice resurfacing machine as well as the industry standard temperature required to clean the ice.

In one implementation, the pipes 310 are connected to a 5 kilowatt main water tank circulation heater 320. The circulation heater can be adjusted to heat the filtered water to any suitable temperature which may be dictated by industry standards. The circulation heater heats the Thermal 75 oil to 400° C. and the heated oil is pumped (using pump 330) through the stainless steel circulation heater pipes 310. The heated oil heats the filtered water in the main water tank 140 to the industry standard temperature of 140° C. (though a person skilled in the art would be well aware that the water in the main water tank can be heated to any desired temperature).

To further clean the filtered water, a water purification subsystem may be used. One such subsystem may use one or more submersible ultraviolet filters. These filters, each of which exposes the filtered water to ultra-violet light to purify the water, may be placed in the main water tank 140. A person skilled in the art would understand that other suitable purification subsystems could be used in addition to or as an alternative to ultraviolet light, including purification tablets, chemicals and combinations thereof.

Returning to FIG. 2, a control panel 340 is installed to control the 5 kilowatt heaters 320 and 245. The control panel may be customized to monitor and adjust the temperature of the heated flowable substance in the pipes 240, 310. As noted above, the heated flowable substance may be Therminol 75 oil. The control panel 340 may include individual temperature and high limit controllers for each of the heaters. In one implementation, the Wattco Control Panel Terminal box NEMA 4 model # WT-6272 was used. This device has a moisture resistant enclosure and includes a main 30A disconnect, 2 digital temperature controllers, 2 high limit controllers, 2 selector switches to be able to manually turn the heaters on-off, 2 red pilot lights which indicate when heater is on, a 240 v/120 v control circuit transformer, and 2 contactors and fuses for 2 loads of 5 kw, 240 v, 3 ph.

Shut off valves may be used to isolate the water for maintenance use.

A separate power system 160 may be required to power the snow tank heating subsystem and the main water tank heating subsystem 150. The power systems of current ice resurfacing machines use batteries which will not be able to power the heating subsystems. The power system 160 would power the circulation heaters 320, 245 as well as the pumps 265, 330.

Referring to FIG. 5, a block diagram of the power system 160 is illustrated. In one implementation, the power system 160 includes eight 12V deep cycle batteries 360. These batteries 360 are connected to two 6000 watt inverters 370 and two 2500 watt inverters 380. The batteries 360 are also connected to a 300A alternator 390 which would be used to charge the batteries 360.

Each of the circulation heaters 320, 245 is connected in series to a deep cycle battery 360 and by way of one of the 6000 watt inverters 370.

Each of the pumps 330, 265 is connected in series to one of the deep cycle batteries 360 by way of one of the 2500 watt inverters 380.

When the water temperature in the main water tank 140 falls below a specified temperature, a temperature sensor will activate the two 12 volt deep cycle batteries 360 to power up the 6000 watt main water tank circulation heater 320. The main water tank circulation heater 320 would then heat up the thermal oil. This, in turn, would heat the water in the main water tank 140 to the required industry standard temperature.

In one implementation, the system includes a means for maintaining the temperature of the heated water in the main water tank 140. When the ice resurfacing machine 100 is parked and shut down, power system 160 can be plugged into an external 220V power source from the arena. A transfer switch 400 and plug 410 can be used as a back up when the ice resurfacing machine 100 is parked and shut down overnight.

If the power output from deep cycle batteries 360 drops below a nominal operating condition, and if the alternator of the ice resurfacer is unavailable because the ice resurfacing machine is not turned on, the transfer switch 400 would engage the external power source by way of the plug 410 to charge the batteries 360 while the water is being heated up.

The inverters 370, 380, batteries 360, transfer switch 400, control panel 340, heaters 320, 245, and pumps 330, 265 are all connected to a fuse box (not shown). As would be clear to a person skilled in the art, the power system is interconnected with wires (not shown) in order for the electronic devices to communicate with each other.

As an alternative, an inverter could be used. For this alternative, two batteries would be connected in series to the inverter which would connect to a heater and pump set. As an example two batteries and a larger inverter would connect to heater 320 and pump 330. Similarly, two batteries and an inverter would connect to heater 245 and pump 265.

A float and alarm system may also be used with the main water tank 140 to ensure that the water level in the main water tank does not drop below a certain level.

Alternatives and variants to the system described above are, of course, possible. In one variant, a blower or heater may be used either as a substitute or in conjunction with the snow tank heating subsystem. Another variant may use a tankless water heater system in place of installing a main water tank heating system for the main water tank 140. A further variant may use an extra water tank in the event evaporation or water loss causes the main water tank 140 to have insufficient water to resurface the ice rink.

The system described above can be operated according to one aspect of the invention. As the ice resurfacing machine 100 moves in forward direction along the ice surface, the blade 180 shaves a thin slice off the ice surface. This thin slice is then collected by a series of coupled horizontal augers 190 and vertical augers 200. The ice and snow shavings 210 are then deposited at the snow dump tank receptacle 110. Inside the snow dump tank 110, the collected ice and snow shavings are melted by the snow tank heating subsystem. The water resulting from the melted ice and snow shavings then flows through the filtering subsystem 130 where the water is filtered. After filtering, the filtered water flows into the main water tank 140. Inside the main water tank 140, the water is heated to an industry standard by the main water tank heating subsystem 150. The heated water from within the main water tank 140 is directed to the conditioner 170 through the existing water distribution system. The heated and purified water is then poured on to the ice surface and spread evenly across the conditioner width by a towel 20 to leave a smooth clean ice surface.

One aspect of the invention provides a kit of parts for retrofitting an existing ice resurfacing machine so that snow and ice shavings from an ice rink can be recycled for further ice resurfacing. The kit of parts may include the heating subsystems 120/150, the insulation for the snow dump tank 110, the filter subsystem 130, and the power system 160.

It should be noted that another aspect of the invention involves the maintenance and servicing of retrofitted ice resurfacing machines. Once an ice resurfacing machine has been retrofitted to recycle ice shavings, on-going maintenance and service may be provided to the operator of the retrofitted ice resurfacing machine. The maintenance and service may include providing a qualified maintenance worker to inspect the various components which were installed on the ice resurfacing machine. Specifically, the maintenance worker would check and clean the heated metal grate 230 in the snow dump tank 110, and replace the filter 270 in the filtering subsystem 130. The maintenance and service would also include draining and replacing the heating oil used in the heating pipes 310, 240. Finally, the maintenance and service would include the replacement of any component which may be defective or which may not be working properly. The entity providing the maintenance and upkeep service to the ice resurfacing machine may do so under a suitable contract. The sale of a retrofit kit, installation of the retrofit kit to the ice resurfacing machine, and the service and maintenance of the retrofitted machine may all be provided under a single contract and price point.

As an extra service to the operators of the converted ice resurfacing machines, the water derived from the ice and snow scraped from the ice rink can also be disposed of in a safe manner. The water from the melted ice may be tainted with contaminants such as those from the paint used to color the ice surface, the logos on the surface, as well as the lines on the ice. While the ice scraped from the ice surface can be recycled, disposing of the waste water is not as simple as dumping the ice and the contaminated water outside the arena. The safe and proper disposal of this material can be provided as a further service to the operators of the converted ice resurfacing machines. The safe disposal may, of course, take different forms as the disposal should conform to the standards and rules in the area where the ice resurfacing machines are being used.

In one embodiment, the disposal of the contaminated water may involve pumping the contaminated water resulting from the scraped ice from the ice resurfacing machine's main water tank into a qualified disposal tank. Any remaining contaminated water is then cleaned from the main water tank. The contaminated water is then disposed of in accordance with existing relevant government regulations. This final step may involve transporting the contaminated water to an environmental hazard waste depot and disposing of the contaminated water at the facility.

A person understanding this invention may now conceive of alternative structures and embodiments or variations of the above all of which are intended to fall within the scope of the invention as defined in the claims that follow.

What is claimed is:

1. A system for recycling water derived from ice from an ice rink, the system comprising:
    a snow tank for receiving ice shavings removed from said ice rink by an ice resurfacing machine;
    a snow tank heating subsystem for heating said ice shavings to thereby melt said ice shavings and produce water;
    a main water tank for receiving and storing the water produced from the melted ice shavings;
    a water tank heating subsystem for heating the stored water in said main water tank to produce heated water;
    a conduit system for routing heated water from said main water tank for use in resurfacing said ice rink;
wherein said system is located on said ice resurfacing machine.

2. The system according to claim 1, wherein the system further includes a filtration subsystem for filtering the water resulting from the melted ice shavings to produce filtered water; wherein the melted water is directed through the filtration subsystem prior to being stored in the main water tank.

3. The system according to claim 1, wherein the system further includes a water purification subsystem.

4. The system according to claim 3 wherein said water purification subsystem comprises a subsystem for exposing said filtered water to one of ultraviolet light, purification tablets, chemicals, and combinations thereof.

5. The system according to claim 2, wherein said filtration subsystem comprises at least one filter placed between said snow tank and said main water tank.

6. The system according to claim 1, wherein said snow tank is downwardly angled to cause said ice shavings and said water to flow towards said main water tank.

7. The system according to claim 1, wherein said snow tank heating subsystem heats and circulates a heated flowable substance in at least one pipe or tube located at a bottom of said snow tank.

8. The system according to claim 7 further comprising a removable grill sitting atop said at least one pipe or tube.

9. The system according to claim 7, wherein the heated flowable substance comprises an oil.

10. The system according to claim 7, wherein said snow tank heating subsystem further comprises at least one blower for blowing heated air on to said ice shavings.

11. The system according to claim 1, wherein said water tank heating subsystem heats and circulates a heated flowable substance in at least one pipe or tube adjacent said main water tank.

12. The system according to claim 11, wherein the heated flowable substance comprises an oil.

13. The system according to claim 1 wherein said snow tank heating subsystem comprises at least one active heating element located adjacent said snow tank.

14. The system according to claim 13, wherein said water heating subsystem is a tankless water heater.

15. The system according to claim 1, wherein said water tank heating subsystem comprises at least one active heating element located adjacent said water tank.

16. The system according to claim 15, wherein said water heating subsystem is a tankless water heater.

17. The system according to claim 1, wherein said system comprises a power supply subsystem for powering one or more of said heating subsystems, said power supply subsystem being different and separate from a power supply for powering said ice resurfacer.

18. The system according to claim 17, wherein said power supply subsystem is also for powering both said snow tank heating subsystem and said water tank heating subsystem.

19. A method for modifying an existing ice resurfacing machine, the method comprising:
   replacing or modifying an existing snow tank to be in flow communication with a main water tank;
   installing a snow tank heating subsystem for heating ice shavings in said snow tank;
   installing a filtering subsystem, said filtering subsystem being for filtering water produced when said ice shavings are heated by said heating subsystem to produce filtered water and for diverting filtered water to a main water tank; and
   installing a water tank heating subsystem, said water tank heating subsystem adapted for heating filtered water in said main water tank.

20. The method according to claim 19 further including the step of: installing a water purification subsystem.

21. The method according to claim 20 wherein said water purification subsystem comprises a subsystem for exposing said filtered water to one of ultraviolet light, purification tablets, chemicals, and combinations thereof.

22. The method according to claim 19 further including the step of: installing an auxiliary power subsystem for providing power to one or more of said heating subsystem.

23. The method according to claim 22 wherein said auxiliary power subsystem provides power to both said snow tank heating subsystem and said water tank heating subsystem.

24. A method for recycling water derived from ice shavings from an ice rink, the method comprising:
   a) scraping ice shavings from a surface of an ice rink;
   b) placing said ice shavings in a snow tank;
   c) applying heat to said ice shavings to thereby melt said ice shavings and produce water;
   d) directing water produced in step c) to a filtering subsystem;
   e) filtering said water in said filtering subsystem to produce filtered water;
   f) directing said filtered water to a main water tank;
   g) heating said filtered water to a predetermined temperature to produce heated filtered water; and
   h) using said heated filtered water to resurface said surface of said ice rink.

25. The method according to claim 24 wherein said method is practiced using an ice resurfacing machine.

26. A kit of parts for converting an existing ice resurfacing machine, the kit comprising:
   a snow tank heating subsystem for heating an existing snow dump tank on said ice resurfacing machine, said heating subsystem being for melting ice and snow stored in said snow dump tank, said ice and snow being collected from an ice rink being resurfaced;
   a filtration subsystem for filtering water resulting from melted ice and snow;
   a main water tank heating subsystem for heating a main water tank, said main water tank storing filtered water from said filter subsystem;
   a power system for providing power to said snow tank heating subsystem and said main water tank heating subsystem;
wherein a converted ice resurfacing machine resulting from installing said kit of parts on said ice resurfacing machine may use water recycled from said collected ice and snow to resurface said ice rink.

27. The kit of parts according to claim 26 further including a water purification subsystem.

28. The kit of parts according to claim 26, wherein said water purification subsystem comprises a subsystem for exposing said filtered water to one of ultraviolet light, purification tablets, chemicals, and combinations thereof.

29. The kit of parts according to claim 26 wherein said filtration subsystem comprises at least one filter placed between said snow dump tank and said main water tank.

30. The kit of parts according to claim 26, wherein said snow tank heating subsystem heats and circulates a heated flowable substance in at least one pipe or tube located at a bottom of said snow dump tank.

31. A kit of parts according to claim 30 wherein said heated flowable substance comprises oil.

32. The kit of parts according to claim 30 further comprising a removable grill sitting atop said at least one pipe or tube.

33. The kit of parts according to claim 26, wherein said snow tank heating subsystem further comprises at least a one blower for blowing heated air on to said ice shavings.

34. The kit of parts according to claim 26, wherein said water tank heating subsystem heats and circulates a heated flowable substance in at least one pipe or tube adjacent said main water tank.

35. The kit of parts according to claim 33 wherein said snow tank heating subsystem comprises at least one active heating element located adjacent said snow dump tank.

36. The kit according to claim 26, wherein said water tank heating subsystem comprises at least one active heating element located adjacent said water tank.

37. The kit according to claim 36, wherein said water heating subsystem is a tankless water heater.

* * * * *